United States Patent [19]
Rousseau

[11] Patent Number: 5,789,327
[45] Date of Patent: Aug. 4, 1998

[54] ARMOR PANEL

[76] Inventor: Wm. Richard Rousseau, 10436 Finch Creek Rd., Bellaire, Mich. 49615

[21] Appl. No.: 708,073

[22] Filed: Aug. 27, 1996

Related U.S. Application Data

[60] Provisional application No. 60/002,844 Aug. 28, 1995.
[51] Int. Cl.[6] .................................................. D03D 25/00
[52] U.S. Cl. .......................... 442/135; 442/250; 442/251; 442/254
[58] Field of Search ................................ 442/135, 250, 442/251, 254

[56] References Cited

U.S. PATENT DOCUMENTS

| | | |
|---|---|---|
| 2,562,951 | 8/1951 | Rose et al. . |
| 3,000,772 | 9/1961 | Lunn . |
| 3,567,568 | 3/1971 | Windecker . |
| 3,891,996 | 7/1975 | Leach et al. . |
| 4,048,365 | 9/1977 | Hoover . |
| 4,181,768 | 1/1980 | Severin . |
| 4,186,648 | 2/1980 | Clausen et al. . |
| 4,200,677 | 4/1980 | Bottini et al. . |
| 4,287,607 | 9/1981 | Leach . |
| 4,292,882 | 10/1981 | Clausen . |
| 4,309,487 | 1/1982 | Holmes . |
| 4,403,012 | 9/1983 | Harpell et al. . |
| 4,428,998 | 1/1984 | Hawkinson . |
| 4,510,200 | 4/1985 | Samowich . |
| 4,522,871 | 6/1985 | Armellino, Jr. et al. . |
| 4,574,105 | 3/1986 | Donovan . |
| 4,584,228 | 4/1986 | Droste . |
| 4,608,717 | 9/1986 | Dunbavand . |
| 4,613,535 | 9/1986 | Harpell et al. . |
| 4,623,574 | 11/1986 | Harpell et al. . |
| 4,650,710 | 3/1987 | Harpell et al. . |
| 4,678,702 | 7/1987 | Lancaster et al. . |
| 4,732,803 | 3/1988 | Smith, Jr. . |
| 4,738,893 | 4/1988 | Grillo . |
| 4,748,064 | 5/1988 | Harpell et al. . |
| 4,953,234 | 9/1990 | Li et al. . |
| 4,989,266 | 2/1991 | Borgese et al. . |
| 5,059,467 | 10/1991 | Berkovitz . |
| 5,179,244 | 1/1993 | Zulfe . |
| 5,180,880 | 1/1993 | Zufle . |
| 5,190,802 | 3/1993 | Pilato . |
| 5,317,950 | 6/1994 | Binon et al. . |
| 5,327,811 | 7/1994 | Price et al. . |
| 5,395,671 | 3/1995 | Coppage, Jr. et al. . |
| 5,437,905 | 8/1995 | Park . |
| 5,443,883 | 8/1995 | Park . |

*Primary Examiner*—Johann Richter
*Assistant Examiner*—Taofiq A. Solola
*Attorney, Agent, or Firm*—Miller, Johnson, Snell & Cummiskey, P.L.C.

[57] ABSTRACT

A ballistic-resistant article comprising a composite panel having a plurality of layers of ballistic-resistant cloth woven from high tensile-strength fibers laminated together by an elastomeric adhesive material having oriented polymer chains. The resulting article is less than half the thickness of comparable threat level articles, is lighter than comparable threat level articles, and is buoyant.

19 Claims, 3 Drawing Sheets

ARMOR PANEL

CROSS REFERENCE TO RELATED APPLICATION

This application claims the benefit of U.S. Provisional Application No. 60/002,844, filed Aug. 28, 1995.

BACKGROUND OF THE INVENTION

This invention relates generally to anti-ballistic articles and particularly to a composite anti-ballistic panel for such articles as well as a method for manufacturing such panels.

DISCUSSION OF THE RELATED ART

Historically body armor protected the wearer from swords, lances, and arrows. However, such body armor became ineffective with the development of cross-bows and, later, firearms. But, in World War II, body armor was developed which consisted principally of ballistic nylon and metal plates. Known as the "flak jacket," it was intended to protect against shrapnel, and to slight extent, light weapon fire. A disadvantage with the flak jacket is that it was heavy and very bulky. As a result, the flak jacket of old does not lend itself to today's environmental and situational applications.

The relatively recent development of high tensile-strength fibers such as sold under the trade names KEVLAR®, SPECTRA®, and TWARON® have resulted in significant advances in body armor and related panels. High tensile-strength fibers have been used to produce woven fabrics and cross-ply laminates to produce sheets which, in turn, have been combined to produce anti-ballistic panels. See, for example, U.S. Pat. No. 3,891,996 to Leach et al., assigned to Burlington Industries, Inc., and No. 5,443,883 to Park. Cloth layers made from KEVLAR® and similar materials have also been incorporated in laminates with other fabrics and materials, including nylon film. The multiple layers of material have been held together by various stitching techniques including quilting, back stitching and border stitching, among others. See, for example, U.S. Pat. No. 4,287,607 to Leach assigned to Burlington Industries, Inc., and No. 4,428,998 to Hawkinson assigned to Rockwell International Corporation.

Attempts to improve the efficiency of body armor panels have been numerous. Generally the line of thought has been to simply increase the number of layers of ballistic fabric or cloth. In this way armor panels could be tailored to meet different threat levels. However, improvements in threat level by the addition of more layers resulted in the panels becoming quite thick and bulky similar to the prior art flak jacket. To reduce thickness, the anti-ballistic capabilities of a panel were improved by providing one or more metal plates in front of or in between layers of fabric. However, in such instances protection is improved at the cost of flexibility and comfort.

Other advances have principally been directed to making the panel more rigid. For example, in U.S. Pat. No. 4,613,535 to Harpell et al. assigned to Allied Corporation of New Jersey, a network of high-strength, highly oriented, extended chain polyethylene fibers are coated with a low modulus elastomeric material and incorporated with a rigid layer or member. The rigid layer or member is bonded or otherwise connected to a surface of the laminate. A disadvantage associated with this concept is that each fiber must be substantially coated with the elastomer, otherwise the improved ballistic qualities are not to be achieved. See U.S. Pat. No. 4,613,535, Col. 7, lines 59-65. In addition, the practice set forth above requires complicated thread or fiber forming equipment and coating apparatus resulting in substantial capital cost. Overall, the manufacturing procedure is complex and costly.

Inherent in both of the aforementioned types of armor is their ability to hold water. Vests which rely substantially on the number of ballistic cloth layers tend to be thick. At times, it is akin to wearing a wool jacket in 100° F. weather. Naturally, the wearer perspires and the perspiration is absorbed by the ballistic cloth. It is not unusual over the course of one shift (8-hour day) for the weight of the vest to nearly double because of perspiration. The same is also true of ballistic resistant vests having sheets of plastic between the cloth layers. Because the plastic does not breath well, the wearer perspires, and the perspiration is wicked or absorbed by the cloth or between the layers.

It is clear that increasing the anti-ballistic integrity and capability of body armor by increasing the thickness or by coating individual fibers of the cloth is not a satisfactory approach to providing lightweight, flexible, and effective ballistic articles. Moreover, it is also not desirable to incorporate stiff or rigid members, such as steel plates, to improve effectiveness. If the cost of producing such articles is high, the sale price will be correspondingly high, which impacts the decision to incorporate or use such articles. Likewise, if the resulting product is unwieldy and uncomfortable, it will only be used at times of perceived danger—often a time when not needed most.

SUMMARY OF THE INVENTION

In one form of the ballistic-resistant article embodying the invention, a plurality of sheets of cloth woven from high tensile-strength fibers are laminated together by an elastomeric medium or material to produce a composite panel. The ballistic characteristics are imparted in the panel when the panel is compressed, heat cured, and then post-stressed or stretched at regular intervals.

In another form of the ballistic-resistant panel embodying the invention, a number of layers of ballistic resistant cloth woven from high tensile-strength fibers in a basket-weave pattern are laminated together by an elastomeric adhesive material between adjacent layers of cloth. What is produced is a composite article having alternate layers of cloth and elastomeric material. The cloth comprising at least some of the layers preferably has a denier ranging between 700 and 1600, and most preferably between 1000 and 1600. Moreover, it is preferred that the cloth be woven in a basket-weave pattern to produce between about 20 and about 40 pick points or nibs per square inch. At least some of the elastomeric layers bonding the layers of cloth are stressed to partially orient the polymer chains in the elastomer to produce the desired ballistic resistant characteristics.

The advantages, features, and benefits resulting from the invention include a panel more resistant to penetration by ballistic projectiles resulting in fewer life threatening injuries. Moreover, this benefit is achieved with a thickness generally less than one-half the thickness of conventional ballistic panels providing comparable threat level protection. Because the ballistic panel or article made therefrom is thinner, it weighs less than comparable threat level panels. A further benefit realized from the invention is that the panel does not adsorb moisture. Accordingly, the panel does not become heavier as do comparable ballistic-resistant panels. Rather, the panel embodying the invention has a specific gravity less than water—resulting in the panel being buoyant. Last, but not least, is the superior ballistic resistant characteristic afforded by the panel. Previously, no ballistic-resistant article made from woven or laminated high tensile strength fibers offers the protection on a layer-per-layer basis. That is to say, no other soft armor panel can provide the protection offered by the panel of this invention when reduced to an equal number of cloth layers.

A better understanding of the invention and the advantages provided thereby may be obtained by reference to the specification and the attached drawing figures.

DETAILED DESCRIPTION OF THE PREFERRED EMBODIMENTS

For the purposes of the following description, the term "fiber" shall include a strand of material as well as a yarn or thread made from one or more strands of material. The strands forming the yarn do not need to be continuous, and a number of shorter strands may be "spun" or otherwise combined into a yarn. The fiber as defined herein has a length considerably greater than its transverse cross-sectional dimension. Additionally, the term "composite," as used herein, shall refer to an article assembled from different components or materials to produce an integral, substantially indivisible unit. Lastly, the terms "front," "back," "left," "right," "up," "down," "top," or "bottom" as used herein will refer specifically to the relative position of an article with respect to the article shown in FIG. 1, unless specifically mentioned to the contrary.

Ballistic-resistant articles, such as anti-ballistic vests, have been available for a considerable number of years, particularly since the advent of materials such as ballistic nylon. In the ballistic resistant vest 10 embodying this invention, comparable threat levels protection is provided by a composite anti-ballistic panel which, on average, is less than half the thickness of conventional armor. The panels are also substantially waterproof so its weight does not increase with use. Moreover, the panels are buoyant.

The ballistic-resistant vest 10 is one example of an article configured to substantially conform to the shape of the user. This invention also may be used to produce ballistic articles, such as helmets, protective leggings, protective panels for automobiles, or mechanized vehicles such as armored cars and tanks, and aircraft. Referring to FIGS. 1–4, vest 10 includes a front portion 12 having a shape configured to substantially cover the chest, abdomen, and sides of the user. A back 14 is also provided which is configured to substantially cover the user's back from the base of the neck to the lower back, and laterally from shoulder to shoulder. Front 12 is interconnected to back 14 by elastic straps 16. Elastic straps 16 are preferably sewn to one portion of a hook-and-loop fastening system while the upper portions and sides of both panels 12 and 14 contain the opposite portion 20 of the fastener. Such material is available under the trademark VELCRO. The elastic straps, together with the hook-and-loop fasteners provide a wide range of adjustability to fit the vest 10 to the user. It is also contemplated that other methods may be used to interconnect the front and back portions, such as a one-piece, pullover, and/or cloth straps or webbing secured with buckles or the like.

Figures 1, 2, 3:
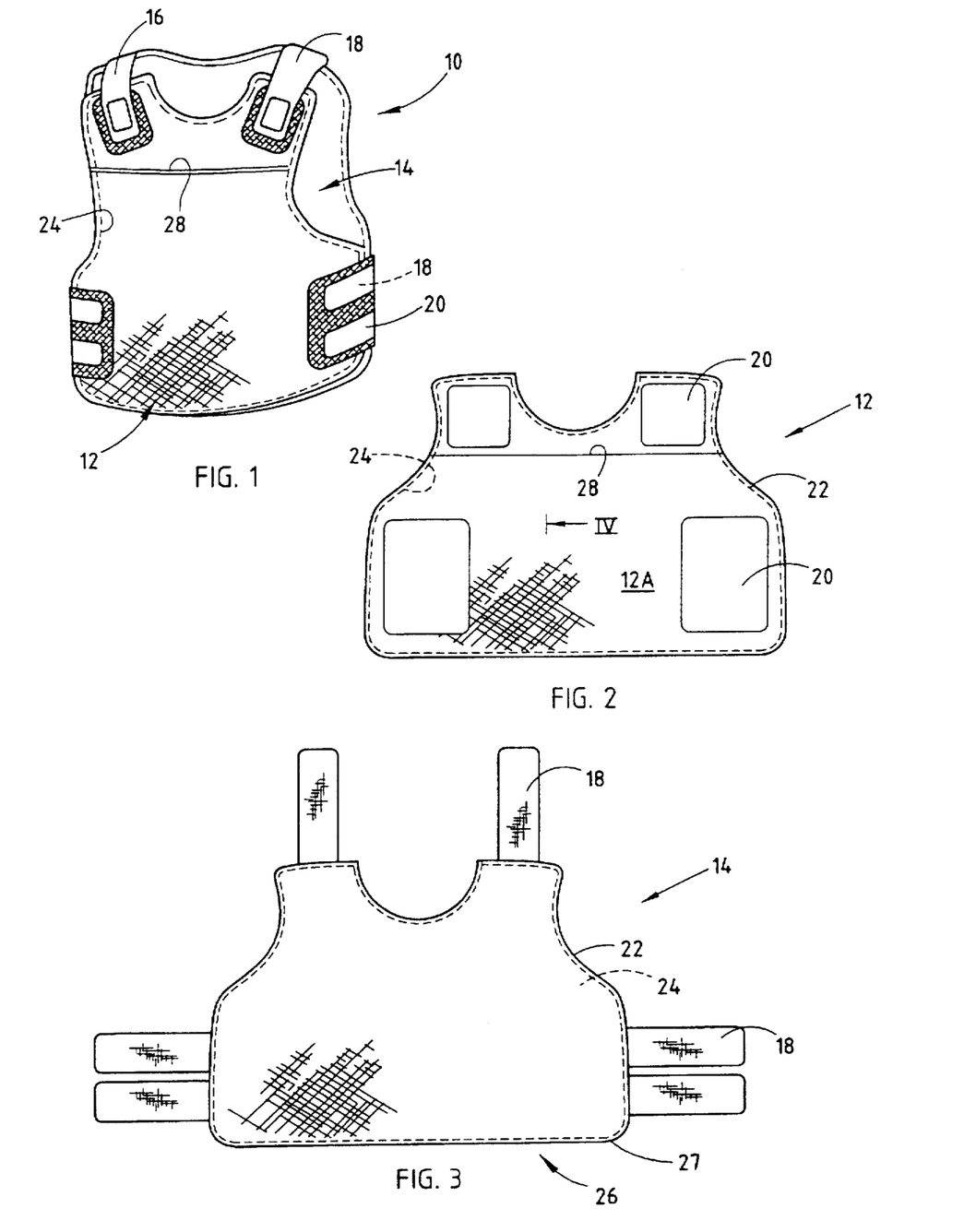
FIG. 1 is a general illustration of one article manufactured using composite anti-ballistic panels embodying the invention.
FIG. 2 is a plan view of a front panel of the article shown in FIG. 1.
FIG. 3 is a plan view of a rear panel of the article shown in FIG. 1.

Each of the front and back portions 12, 14 includes an outer cover or carrier 22 which surrounds and holds an inner composite ballistic panel 24. Preferably, carrier 22 is made from a material which is comfortable and flexible yet durable, such as cotton or blended fabric. The carrier 22 may also be made from colored fabrics to match agency or military uniforms and is capable of receiving indicia printed thereon. An opening 26 is preferably provided along one edge, such as the lower edge 27, to permit removal of the carrier 22 from around the inner composite ballistic panel assembly 24. Given the waterproof characteristic of composite 24 briefly mentioned above, carrier 22 is substantially the only component which absorbs perspiration. The front 12a of the carrier may include a pocket 28 to receive and position a ballistic plate (not shown) over the chest of the wearer. Ballistic plates are known and may be made from aluminum, steel, or ceramic and laminates thereof. Moreover, ballistic-resistant cloth panels embodying this invention, either alone or in combination with a metal plate or composite, may also be used.

Figure 4:
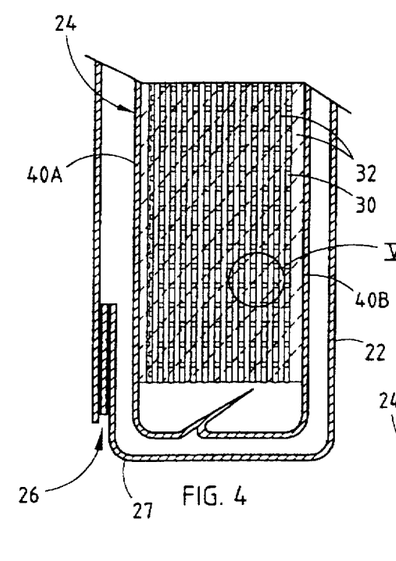
FIG. 4 is a fragmentary section view of the front panel along line IV—IV in FIG. 2.
Figure 5:
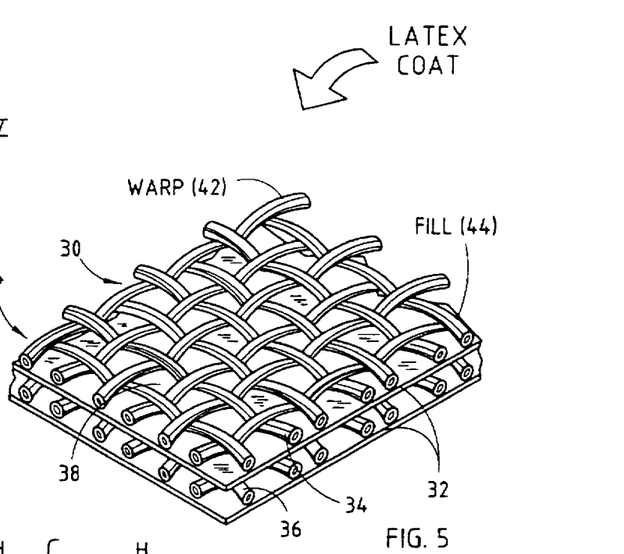
FIG. 5 is an enlarged fragmentary oblique view of two layers of anti-ballistic cloth laminated by elastomeric layers to produce the composite anti-ballistic panel embodying the invention.

In FIGS. 4 and 5, ballistic panel assembly 24 embodying the invention includes a plurality of layers of cloth 30 laminated together by an adhesive 32 to produce a dense, pliable composite which, in turn, may be sandwiched between a pair of cloth end panels 40, 40a. Each layer or ply of cloth 30 is preferably woven from high tensile-strength fibers or yarn spun from such fibers. Examples include aramid fibers, ultra-high molecular weight polyethylene fibers, ultra-high molecular weight polypropylene fibers, ultra-high molecular weight polyvinyl alcohol fibers, ultra-high molecular weight polyacrylonitrile fibers, or combinations thereof. Fibers of the type generally mentioned above are available under the trade name KEVLAR® from E. I. dupont de Nemours, SPECTRA® from Allied Corporation, and TWARON® from Akso-Nobel of Germany. In a preferred embodiment, each ply of ballistic cloth 30 is woven from duPont KEVLAR® brand 29 yarn having a 1500 denier and woven in a basket-type weave to produce a fabric having 24-by-24 cross-over points or nibs per square inch. It is also preferred that the KEVLAR 29 yarn used be flat or untwisted during the weaving process. Ballistic cloth woven in this fashion is available from Fiber Materials, Inc., of Briddeford, Me., under the designation 29-10. The 29-10 KEVLAR® cloth is also known in the industry as 710 ballistic fabric or KEVLAR 710. As a result of the traditional basket-weave of the warp and fill fibers, the 29-10 cloth has an evenly distributed or balanced tensile modulus along the two principal axes defined by the warp and fill. A woven material with a fill having a tensile modulus different from the warp results in unbalanced stresses on the weave, producing disproportionate "runs" in the fabric. The disproportionate stresses on the warp and fill fibers may cause the projectile to change shape and cut through the material. It has been well documented that fibers of this type are much stronger in the direction of the length of the fiber than in a transverse direction. It has also been said that such fibers alone are cut easily. Such inequalities in the tensile modulus of the fill and warp fibers may result in complete penetration or a pass through of the projectile through the panel. Understandably, this is an undesirable trait. Although 29-10 fabric is preferred, other materials may also be used, including KEVLAR 129 having an 840 denier and woven in a basket-type weave producing a fabric having 31-by-31 nibs per square inch. This material is also preferably woven without twist in either the warp or fill yarns to provide substantially the same tensile characteristics in all directions. KEVLAR 29 may also be woven much tighter to produce a 31-by-31 nib pattern.

Between each ply 30 of ballistic fabric is an elastomer coating or layer 32 (FIG. 5). The elastomer 32 bonds adjacent layers 30 of ballistic cloth, substantially covering the facing surfaces 34, 36 of adjacent layers 30 and filling in gaps 38 between the warp 42 and fill 44. It is anticipated that some of the elastomer 32 may actually extend through gaps 38 to bond with the elastomer 32a on the opposite side of the ply 30. In this fashion, a preferred desired number of ballistic fabric layers 30 are laminated together to produce the composite panel 24.

Bounding outermost layers 30 and interconnected thereto by elastomer 32 are sheets 40, 40a of non-ballistic cloth, such as CORDURA or similar fabric. In a preferred embodiment, each sheet of cloth 40, 40a is adhered to an opposite side of the laminate by the elastomer 32. Plies 40, 40a may be oversized such that the edges can be sewn together to completely encase the laminate therein. The CORDURA cover reduces abrasion to the edges of the panel 24 and provides an aesthetically pleasing package. In other applications, such as aircraft, the exterior cloth covering 40, 40a could be dispensed with, particularly if the panel is applied to the interior surface of a structure. The exposed surfaces of the panel may only need a coat of elastomer. If the panel is applied to an exterior or visible surface of a structure, the exposed surfaces of the panel may be covered with a protective paint or covering of some kind, particularly if a pleasing appearance is desired.

General reference has been made to an elastomer 32 bonding the layers of ballistic cloth 30 together. Although it is generally anticipated that a number of materials having elastic properties may be used. Examples of such materials include thermoplastics, adhesives, thermo-set adhesives, rubbers, or other materials capable of recovering from large deformations quickly and forcibly. From this group of materials, rubber is preferred. Rubber may be comprised of natural rubber, synthetic rubber, or compounds containing both. Synthetic rubbers include polybutadiene rubbers (BRs); polyisoprene rubbers (IRs); the 1000 series of styrene-butadiene rubbers (SBRs); nitrile rubbers (NBRs); butyl rubber (IIR); ethylene-propylene terpolymer (EPDM); silicone rubbers; types GN, GNA, GW, FB, and GRT neoprenes (CRs); polysulfides; polyacrylate rubbers; epichlorohydrin rubbers; fluoroelastomers (FDM); HYPALON, a chlorosulflorinated polyethylene (CSM); halogenated butyl; and chloronited polyethylene rubbers (CPEs). However, the most preferred material is natural latex rubber. Compounding of the latex rubber is done in the liquid state, and the compounded liquid latex is used without first being converted to a solid. Most uses of latex rubber require modification by the addition of vulcanizing agents. Other compounding may include anti-oxidants to improve resistance to aging, as well as fatty acids and metal oxides. In particular, the preferred natural rubber is available from Blakely Products of Warren, Mich., under the designation G103. It has been found in limited testing that hard resins and epoxies including fiberglass materials do not provide as good a ballistic property as the present invention. Details on how this structure is imparted will be described more fully below.

Manufacturing of ballistic resistive panel 24 embodying the instant invention first requires identification of the article to be manufactured. In the example of vest 10 described above, little equipment is needed. Generally, the ballistic cloth is cut to a predetermined pattern such that when shaped, the panel substantially conforms to the desired object. Also, the level of protection or threat level to be provided should be determined. For example, in the case of a vest resistant to 158 grain 357 Magnum JSP rounds having a velocity of 1250 feet per second, and 124 grain 9 millimeter (mm) FMJ rounds traveling at 1090 feet per second (fps) (threat level II-A established by the National Institute of Justice), 15 plies of KEVLAR® brand 29, 1500 denier, 24-by-24 nib cloth are used. To produce a threat level II vest (protection from the same rounds at velocities of 1395 and 1175, respectively established by the National Institute of Justice), 15 layers of cloth are used, while 18 layers of cloth are used to produce panels resistant to 240 grain 44 Magnum rounds having velocities on the order of 1400 fps and 9 mm at 1400 fps. For more information on threat levels and National Institute of Justice standards, the reader is referred to the articles or papers entitled, "Selection and Application Guide to Police Armor," NIT Guide 100-87, and "Ballistic Resistance of Policy Body Armor," NIJ Standard 0101.03, the disclosures of both of which are incorporated herein by reference.

Once the appropriate number of ballistic cloth layers are assembled, and the appropriate mold or pattern has been selected, a thin sheet of plastic is placed over the pattern to act as a separator. In the preferred embodiment, the outer protective layer, such as the CORDURA fabric, is placed over the separator. A first layer of natural latex rubber elastomer 32 is applied thereon and evenly distributed in a thin coat. The natural latex rubber is then worked into the spaces of the weave. Once the first elastomer layer 32 is applied, the first ply of ballistic cloth is applied. A bray, hand roller, or other tool is used, starting from about the middle of cloth 30 outwardly to press cloth 30 against the elastomeric adhesive 32 and to force excess elastomeric material 32 to the outer edges. Spreading of the elastomeric adhesive 32 also helps remove bubbles from between the layers. Once completed, a layer or coat of elastomeric material 32 is applied to the exposed surface of prior ballistic layer—again spreading elastomer 32 over the ply in a manner to force some of the adhesive into the interstices of fabric 30. Once complete, and as in the previous step, a subsequent layer of ballistic cloth is applied over the previous layer. The excess elastomer 32 and air bubbles are forced to the perimeter. This process is repeated until the desired number of ballistic resistant cloth layers are laminated together. To reduce fraying and prevent separation of the weave at the perimeter of the composite panel, the excess elastomer adhesive 32 rolled or squeegeed from panel 24 is redistributed about the panel perimeter. In this manner, the edges of the woven panels are encapsulated and any fraying is substantially curtailed. The ballistic panel assembly is finished by adhering the outer protective covers 40, 40a to the opposite sides of panel 24.

Figure 6:
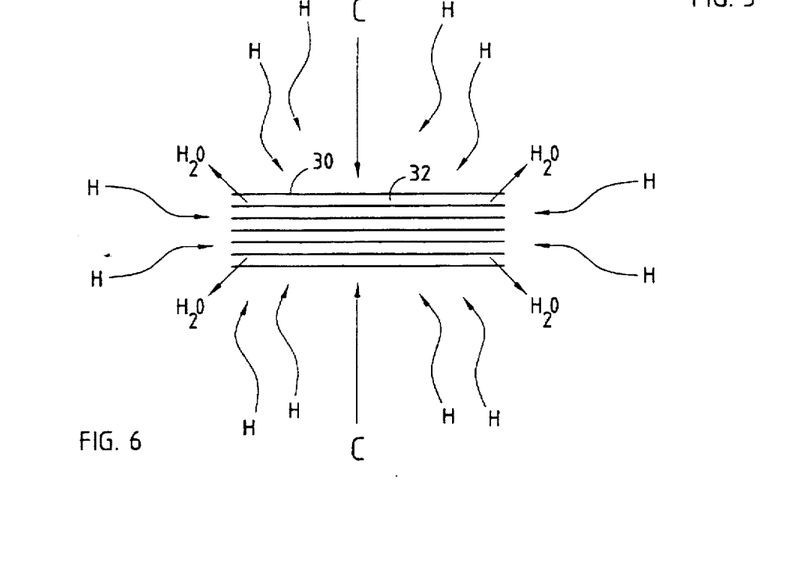
FIG. 6 is a schematic of a composite anti-ballistic panel subjected to pressure and heat as part of the manufacturing process.

Once the desired number of ballistic cloth layers 30 are assembled over the pattern and the end protective cloth sheets have been applied as described above, the mating half of the mold or pattern is located over the newly laminated composite panel 24. Pressure is then applied. The pressure on the composite panel 24 again forces the sandwiched elastomeric materials 32 into the interstices of the cloth plies 30 and 40. The amount of pressure necessary to improve the bond between the layer may range between 40 and 250 pounds, preferably between 100 and 225 pounds, and most preferably on the order of 150 to 200 pounds of pressure is satisfactory. For a 13-layer composite panel embodying the invention, it has been determined that approximately 200 pounds of pressure provides satisfactory results. For panels having more than 13 layers, it is preferred to build-up sets or subassemblies of 6 to 10 layers. The subassemblies are then laminated together using the same process to produce the final product.

After the gross forming or laminating process has taken place as described above, the composite panel assembly 24 is dried. Once the panel is compressed, little space remains for air to infiltrate and cure the elastomer 32. It has been found that if air-dried, the perimeter of panel 24 dries long before the interior, substantially increasing the overall drying time. To expedite the process, the newly formed composite panel 24 is heated in an oven. In a preferred embodiment, a convection oven or similar drier is used to cure the panel. An air-moving drier is preferred to remove moisture produced in the drying process. The panels may be dried at a temperature ranging between 100° F. and 200° F., preferably in the range of 120° F. to 190° F., and most preferably in the range of 150° F. to 170° F. The selected drying temperature should be sufficient to accelerate or drive the moisture from the central regions of the panel before the perimeter is cured. Accordingly, the drying time will vary depending upon the drying temperature selected. At the preferred temperature, drying takes about 7 to 9 hours. Temperatures greater than 200° F. may be used. However, at these temperatures, steam may be produced causing layers to bubble and delaminate. It is important not to dry at a temperature which turns the water to steam. Production of steam may result in delamination or bubbling of the layers. Under extreme conditions, the composite could explode as a result of pressure build-up. At high temperatures, cracking or degradation of the natural latex rubber may also occur.

Once the elastomer 32 has been cured, the panel assembly 24 is removed from the oven and allowed to cool to room temperature. Once at room temperature, it has been found that composite 24 is extremely rigid, and ballistic panel assembly 24 has not fully reached the final desired shape or configuration but retains the shape of the set-up mold. It is at this point of the manufacturing process that remarkable ballistic characteristics are imparted to composite panel 24.

Figure 7:
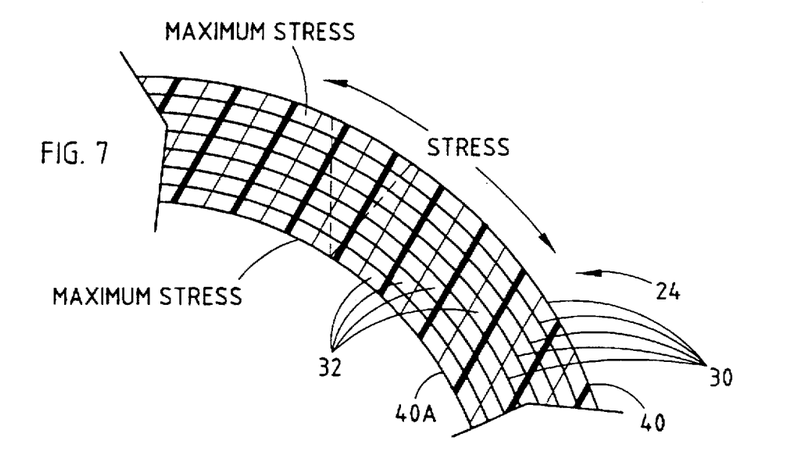
FIG. 7 is a fragmentary schematic section view of the composite anti-ballistic panel under stress.
Figure 8:
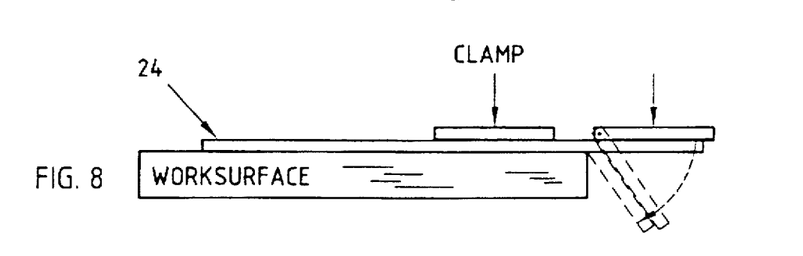
FIG. 8 is a schematic elevation view of one embodiment of a tool for stressing the composite anti-ballistic panel of this invention.
Figure 9:
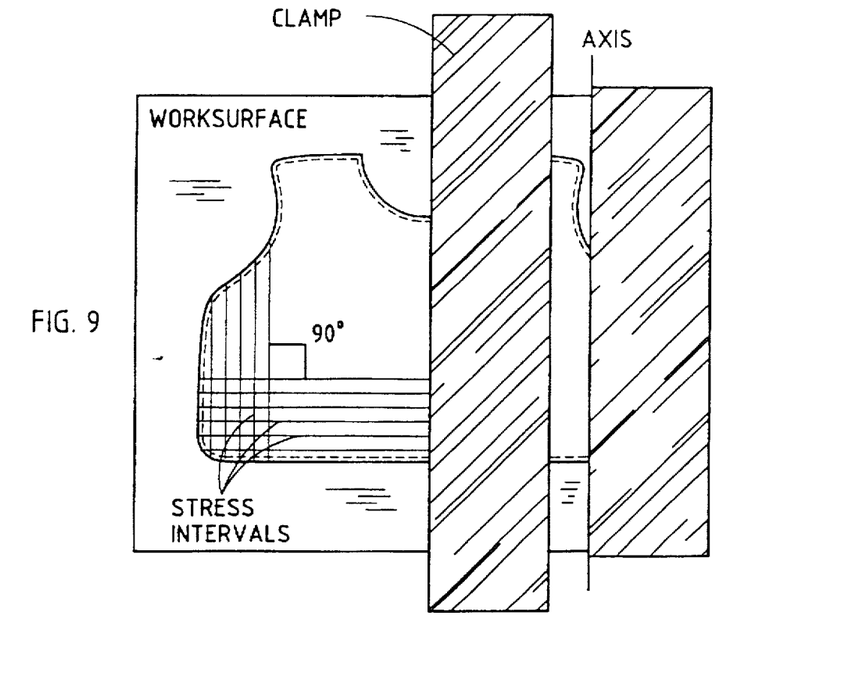
FIG. 9 is a schematic plan view of the tool shown in FIG. 8 for stressing of the composite panel embodying the invention.

The partially shaped and rigid composite 24 is next incrementally stressed or stretched with the aid of a mandrel or other tool to achieve the final shape or configuration of the composite 24. In the case of ballistic resistant vest 10, each panel 12, 14 is bent or stretched at about 0.125 to 1.0 inch intervals. Preferably, stretching or stressing of each panel may be done at approximately 0.5 inch intervals and most preferably every 0.25 inch intervals. The incremental stretching or stressing is preferably done at intervals to impart a substantially constant characteristic across the entire panel. If the intervals are too large, localized areas of the panel may be stressed, while others are not. Accordingly, the incremental stretching is completed in one direction across the entire panel. The panel is then preferably rotated 90 degrees and the process is repeated. The stretching may occur in a number of modes, including bending about a curved rod or edge or by applying opposing, horizontal forces. For example, each panel may be securely held by two sets of jaws, each set separated from the other by 0.125 to about 1.0 inch. The sets of jaws may mechanically move away from each other to place the panel in tension over that section of the panel. Tension is then released and the panel adjusted by the separation distance between the sets of jaws so the process can be repeated. In a preferred embodiment, each panel is located in a device with the front of the panel oriented upward. Panel 24 is temporarily clamped in place such that a portion of the panel (approximately 0.125 to 1.0 inch) overhangs an edge of a plate beneath the composite 24. Presently, it has not been determined whether a squared edge or radiused edge works best. The portion of panel 24 overhanging the edge is then pushed downward to an angle of at least 10 degrees, preferably about 30 degrees, and most preferably at least 45 degrees. Stretching of the panels in this fashion results in gradational stretching from front to back with greater stretching in the layers farthest from the axis of rotation and little stretching of the layers closest to the axis of rotation. See FIG. 7 for example. Once a stretch has been made, panel 24 is incrementally moved over the edge and the process is repeated until the entire panel has been stressed. The panel is then rotated 90 degrees and the process is repeated.

In an alternate embodiment of the invention, it is anticipated that for articles having a concave/convex structure, this in-situ stretching step could be accomplished by placing a flat or partially shaped panel over a concave or convex pattern. A plunger having a mating portion of the pattern at one end could be used to force the composite panel 24 over or into the pattern. As the entire panel is deformed, this gradational stretching of the elastomer layers 32 from the front surface to the back surface would occur as the panel took on the shape of the pattern. The panel may require tension in certain areas to provide that stretching or stressing is generally uniform along any two orthogonal axes within the plane of the panel. Such a procedure would be in keeping with the desired characteristic that the composite panel 24 and the materials therein have substantially constant tensile properties in all directions in the plane of the composite panel 24 to avoid producing "cutters" which could pierce through the composite panel. This characteristic, however, does not require that all of the fabric layers be made from the same material. For it is contemplated that a composite ballistic panel, such as 24, may have layers formed from a different material weave or denier. Of course, for any of the above-mentioned stretching or stressing procedures, it would be undesirable to stretch the composite panel to a point of failure. Similarly, delamination of the multiple layers would also not be a desired characteristic. However, in the case where natural latex rubber is the elastomer, if delamination does occur after stretching or stressing, it is a simple matter of applying a minor amount of compressive force to rejoin the layers. It has been found that there is sufficient bonding property remaining when two sheets of ballistic fabric previously coated with elastomer are laminated together. This characteristic also provides an important property to a ballistic panel.

In conventional composite ballistic panels, and particularly those which have been sewn or quilted, the impact of a round on the ballistic fabric layers passes through some of the layers but not all. The layers immediately surrounding the penetration point of the round are often delaminated or "puffed" from the others. Often the damage to the laminations immediately adjacent the penetration is so severe that the ballistic stopping qualities are greatly diminished. However, in the instant invention, the elastomer surrounding the cloth layers preserves the ballistic stopping property immediately adjacent a penetration. No "puffing" occurs and a second round may be stopped equally effective at a point right next to the previous round. If delamination occurs as result of a penetration, a self-healing occurs during the rebound as a result of the tackiness or sticky characteristic of the rubber elastomer.

Samples of composite ballistic panels as described above were submitted to various testing facilities to document the substantially improved ballistic characteristics of the product. The products submitted and the test procedures followed by each organization are set out below.

H. P. White Laboratory, Inc., of Street, Md., conducted ballistic resistance tests on eight panels (four complete male vests), each made from 18-layer KEVLAR 29, 1500 denier, 24-by-24 plain weave (basket style) laminated together by natural latex rubber, and each having an average dry weight of about 1.4 pounds. The samples were tested in accordance with the requirements of NIJ-STD-0101.03, *Ballistic Resistance of Police Body Armor*, dated April 1987 and incorporated herein by reference. The results of the NIJ test are used for certification of the armor in conjunction with the United States Department of Justice's certification program for armor intended for use by law enforcement officers. Typically, the highest NIJ threat level rated for body armor is level III-A and is defined by 33 layers or plies of ballistic cloth. However, because of the construction of the panel embodying the invention tested, plies or layers were not counted. Rather, each panel was rated according to thickness. For example, the 18-ply vest tested measured only 0.308 inch thick.

Twenty-four 0.44 Magnum 240 grain, SWCGC hand loaded rounds were fired at two 18-ply vest samples, twelve rounds with the vests wet and twelve rounds with the vests dry. Eight rounds were fired from an acute angle of 30 degrees. The velocities of the twenty-four rounds ranged between 1408 feet per second to 1449 feet per second. As seen in Table 1, no penetrations were recorded, and back face signatures were less than 40 mm—well below the 44 mm maximum permitted by the NIJ standards. The test was repeated using twenty-four, 9 mm, 124 grain full-metal jacketed (FMJ) slugs. As in the previously reported test, eight rounds were fired from an angle of 30 degrees to the panel. The velocities of the bullets ranged from about 1401 feet per second up to about 1487 feet per second. Not one 9 mm slug penetrated a tested panel and the back face signature never exceeded 24 mm. Similar testing was performed by H. P. White Laboratory, Inc., on two other composite ballistic panels embodying the invention, and made from 15 and 13 layers, respectively, of both KEVLAR 29, 1500 denier, 24-by-24 plain weaver cloth laminated with natural latex rubber, as described above. The results of these tests are shown in Tables 2 and 3, respectively.

TABLE 1

| | FRONT | | | | BACK | | |
|---|---|---|---|---|---|---|---|
| Seq. | Cond. | Vel. | Results | Seq. | Cond. | Vel. | Results |
| BODY ARMOR TEST - MODEL C3A/.44 MAGNUM | | | | | | | |
| 1 | Wet | 1446 | N 37 mm | 1 | Wet | 1448 | N 36 mm |
| 2 | Wet | 1442 | N | 2 | Wet | 1444 | N |
| 3 | Wet | 1445 | N | 3 | Wet | 1431 | N |
| 4 | Wet | 1431 | N* | 4 | Wet | 1437 | N* |
| 5 | Wet | 1437 | N* | 5 | Wet | 1431 | N* |
| 6 | Wet | 1439 | N | 6 | Wet | 1427 | N |
| 7 | Dry | 1441 | N 37 mm | 7 | Dry | 1442 | N 38 mm |
| 8 | Dry | 1442 | N | 8 | Dry | 1425 | N |
| 9 | Dry | 1431 | N | 9 | Dry | 1408 | N |
| 10 | Dry | 1428 | N* | 10 | Dry | 1435 | N* |
| 11 | Dry | 1436 | N* | 11 | Dry | 1449 | N* |
| 12 | Dry | 1433 | N | 12 | Dry | 1437 | N |
| BODY ARMOR TEST - MODEL C3A/9 MM | | | | | | | |
| 13 | Wet | 1411 | N 21 mm | 13 | Wet | 1429 | N 24 mm |
| 14 | Wet | 1429 | N | 14 | Wet | 1440 | N |
| 15 | Wet | 1435 | N | 15 | Wet | 1442 | N |
| 16 | Wet | 1432 | N* | 16 | Wet | 1454 | N* |
| 17 | Wet | 1437 | N* | 17 | Wet | 1435 | N* |
| 18 | Wet | 1450 | N | 18 | Wet | 1456 | N |
| 19 | Dry | 1435 | N 21 mm | 19 | Dry | 1402 | N 23 mm |
| 20 | Dry | 1438 | N | 20 | Dry | 1487 | N |
| 21 | Dry | 1429 | N | 21 | Dry | 1413 | N |
| 22 | Dry | 1420 | N* | 22 | Dry | 1401 | N* |
| 23 | Dry | 1434 | N* | 23 | Dry | 1437 | N* |
| 24 | Dry | 1432 | N | 24 | Dry | 1434 | N |

* = 30 Degree Obliquity Impact
N = No Penetration

TABLE 2

| | FRONT | | | | BACK | | |
|---|---|---|---|---|---|---|---|
| Seq. | Cond. | Vel. | Results | Seq. | Cond. | Vel. | Results |
| BODY ARMOR TEST - MODEL RS II/.357 MAGNUM | | | | | | | |
| 1 | Wet | 1437 | N 37 mm | 1 | Wet | 1435 | N 38 mm |
| 2 | Wet | 1425 | N | 2 | Wet | 1422 | N |
| 3 | Wet | 1431 | N | 3 | Wet | 1451 | N |
| 4 | Wet | 1436 | N* | 4 | Wet | 1442 | N* |
| 5 | Wet | 1433 | N* | 5 | Wet | 1433 | N* |
| 6 | Wet | 1440 | N | 6 | Wet | 1429 | N |
| 7 | Dry | 1430 | N 38 mm | 7 | Dry | 1417 | N 40 mm |
| 8 | Dry | 1425 | N | 8 | Dry | 1430 | N |
| 9 | Dry | 1431 | N | 9 | Dry | 1434 | N |
| 10 | Dry | 1431 | N* | 10 | Dry | 1419 | N* |
| 11 | Dry | 1448 | N* | 11 | Dry | 1439 | N* |
| 12 | Dry | 1425 | N | 12 | Dry | 1444 | N |
| BODY ARMOR TEST - MODEL RS II/9 MM | | | | | | | |
| 13 | Wet | 1194 | N 30 mm | 13 | Wet | 1200 | N 27 mm |
| 14 | Wet | 1173 | N^c | 14 | Wet | 1215 | N |
| 15 | Wet | 1215 | N | 15 | Wet | 1223 | N |
| 16 | Wet | 1218 | N* | 16 | Wet | 1219 | N* |
| 17 | Wet | 1227 | N* | 17 | Wet | 1222 | N* |
| 18 | Wet | 1168 | N*,c | 18 | Wet | 1224 | N |
| 19 | Wet | 1236 | N* | 19 | Dry | 1225 | N 31 mm |
| 20 | Wet | 1217 | N | 20 | Dry | 1236 | N |
| 21 | Dry | 1232 | N 27 mm | 21 | Dry | 1212 | N |
| 22 | Dry | 1208 | N | 22 | Dry | 1213 | N* |
| 23 | Dry | 1184 | N | 23 | Dry | 1221 | N* |
| 24 | Dry | 1192 | N* | 24 | Dry | 1207 | N |
| 25 | Dry | 1168 | N*,c | | | | |
| 26 | Dry | 1178 | N* | | | | |
| 27 | Dry | 1249 | N | | | | |

* = 30 Degree Obliquity Impact
c = Insufficient Velocity
N = No Penetration

TABLE 3

| | FRONT | | | | BACK | | |
|---|---|---|---|---|---|---|---|
| Seq. | Cond. | Vel. | Results | Seq. | Cond. | Vel. | Results |
| BODY ARMOR TEST - MODEL RS II-A/.357 MAGNUM | | | | | | | |
| 1 | Wet | 1291 | N 36 mm | 1 | Wet | 1272 | N 35 mm |
| 2 | Wet | 1280 | N | 2 | Wet | 1291 | N |
| 3 | Wet | 1285 | N | 3 | Wet | 1276 | N |
| 4 | Wet | 1301 | N* | 4 | Wet | 1303 | N* |
| 5 | Wet | 1277 | N* | 5 | Wet | 1284 | N* |
| 6 | Wet | 1290 | N | 6 | Wet | 1295 | N |
| 7 | Dry | 1297 | N 36 mm | 7 | Dry | 1306 | N 37 mm |
| 8 | Dry | 1288 | N | 8 | Dry | 1304 | N |
| 9 | Dry | 1291 | N | 9 | Dry | 1278 | N |
| 10 | Dry | 1296 | N* | 10 | Dry | 1283 | N* |
| 11 | Dry | 1291 | N* | 11 | Dry | 1289 | N* |
| 12 | Dry | 1293 | N | 12 | Dry | 1284 | N |
| BODY ARMOR TEST - MODEL RS II-A/9 MM | | | | | | | |
| 13 | Wet | 1109 | N 25 mm | 13 | Wet | 1143 | N 26 mm |
| 14 | Wet | 1110 | N | 14 | Wet | 1132 | N |
| 15 | Wet | 1139 | N | 15 | Wet | 1112 | N |
| 16 | Wet | 1142 | N* | 16 | Wet | 1119 | N* |
| 17 | Wet | 1118 | N* | 17 | Wet | 1106 | N* |
| 18 | Wet | 1121 | N | 18 | Wet | 1109 | N |
| 19 | Wet | 1128 | N 23 mm | 19 | Dry | 1112 | N 25 mm |
| 20 | Wet | 1115 | N | 20 | Dry | 1095 | N |
| 21 | Dry | 1117 | N | 21 | Dry | 1136 | N |
| 22 | Dry | 1139 | N* | 22 | Dry | 1135 | N* |
| 23 | Dry | 1121 | N* | 23 | Dry | 1126 | N* |
| 24 | Dry | 1136 | N | 24 | Dry | 1135 | N |

* = 30 Degree Obliquity Impact
N = No Penetration

TABLE 4

| | FRONT | | | | BACK | | |
|---|---|---|---|---|---|---|---|
| Seq. | Cond. | Vel. | Results | Seq. | Cond. | Vel. | Results |
| BODY ARMOR TEST - MODEL MON II+/.357 MAGNUM | | | | | | | |
| 1 | Wet | 1445 | N 36 mm | 1 | Wet | 1431 | N 36 mm |
| 2 | Wet | 1426 | N | 2 | Wet | 1425 | N |
| 3 | Wet | 1431 | N | 3 | Wet | 1442 | N |
| 4 | Wet | 1425 | N* | 4 | Wet | 1435 | N* |
| 5 | Wet | 1435 | N* | 5 | Wet | 1430 | N* |
| 6 | Wet | 1433 | N | 6 | Wet | 1433 | N |
| 7 | Dry | 1437 | N 39 mm | 7 | Dry | 1429 | N 39 mm |
| 8 | Dry | 1418 | N | 8 | Dry | 1418 | N |
| 9 | Dry | 1433 | N | 9 | Dry | 1407 | N |
| 10 | Dry | 1410 | N* | 10 | Dry | 1430 | N* |
| 11 | Dry | 1424 | N* | 11 | Dry | 1420 | N* |
| 12 | Dry | 1425 | N | 12 | Dry | 1428 | N |
| BODY ARMOR TEST - MODEL MON II+/9 MM | | | | | | | |
| 13 | Wet | 1182 | N 26 mm | 13 | Wet | 1225 | N 27 mm |
| 14 | Wet | 1228 | N | 14 | Wet | 1227 | N |
| 15 | Wet | 1206 | N | 15 | Wet | 1222 | N |
| 16 | Wet | 1212 | N* | 16 | Wet | 1233 | N* |
| 17 | Wet | 1216 | N* | 17 | Wet | 1219 | N* |
| 18 | Wet | 1214 | N | 18 | Wet | 1203 | N |
| 19 | Dry | 1222 | N 26 mm | 19 | Wet | 1187 | N 25 mm |
| 20 | Dry | 1204 | N | 20 | Dry | 1198 | N |
| 21 | Dry | 1196 | N | 21 | Dry | 1171 | N^c |
| 22 | Dry | 1203 | N* | 22 | Dry | 1221 | N |
| 23 | Dry | 1203 | N* | 23 | Dry | 1221 | N* |
| 24 | Dry | 1200 | N | 24 | Dry | 1219 | N* |
| | | | | 25 | Dry | 1226 | N |

* = 30 Degree Obliquity Impact
c = Insufficient Velocity
N = No Penetration

TABLE 5

| | FRONT | | | | BACK | | |
|---|---|---|---|---|---|---|---|
| Seq. | Cond. | Vel. | Results | Seq. | Cond. | Vel. | Results |
| BODY ARMOR TEST - MODEL MON-II+ LSC/.357 MAGNUM | | | | | | | |
| 1 | Wet | 1433 | N 40 mm | 1 | Wet | 1440 | N 37 mm |
| 2 | Wet | 1442 | N | 2 | Wet | 1453 | N |
| 3 | Wet | 1399 | N | 3 | Wet | 1471 | N |
| 4 | Wet | 1453 | N* | 4 | Wet | 1444 | N* |
| 5 | Wet | 1436 | N* | 5 | Wet | 1444 | N* |
| 6 | Wet | 1425 | N | 6 | Wet | 1433 | N |
| 7 | Dry | 1408 | N 37 mm | 7 | Dry | 1406 | N 36 mm |
| 8 | Dry | 1435 | N | 8 | Dry | 1422 | N |
| 9 | Dry | 1428 | N | 9 | Dry | 1447 | N |
| 10 | Dry | 1423 | N* | 10 | Dry | 1410 | N* |
| 11 | Dry | 1442 | N* | 11 | Dry | 1439 | N* |
| 12 | Dry | 1424 | N | 12 | Dry | 1430 | N |
| BODY ARMOR TEST - MODEL MON-II+ LSC/9 MM | | | | | | | |
| 13 | Wet | 1176 | N 29 mm | 13 | Wet | 1182 | N 28 mm |
| 14 | Wet | 1153 | N^c | 14 | Wet | 1230 | N |
| 15 | Wet | 1200 | N | 15 | Wet | 1197 | N |
| 16 | Wet | 1189 | N | 16 | Wet | 1195 | N* |
| 17 | Wet | 1192 | N* | 17 | Wet | 1179 | N* |
| 18 | Wet | 1202 | N* | 18 | Wet | 1208 | N |
| 19 | Wet | 1211 | N | 19 | Dry | 1196 | N 31 mm |
| 20 | Dry | 1195 | N 28 mm | 20 | Dry | 1210 | N |
| 21 | Dry | 1219 | N | 21 | Dry | 1203 | N |
| 22 | Dry | 1231 | N | 22 | Dry | 1175 | N* |
| 23 | Dry | 1190 | N* | 23 | Dry | 1210 | N* |
| 24 | Dry | 1196 | N* | 24 | Dry | 1176 | N |
| 25 | Dry | 1190 | N | | | | |

* = 30 Degree Obliquity Impact
c = Insufficient Velocity
N = No Penetration

TABLE 6

| | FRONT | | | | BACK | | |
|---|---|---|---|---|---|---|---|
| Seq. | Cond. | Vel. | Results | Seq. | Cond. | Vel. | Results |
| BODY ARMOR TEST - MODEL MON-II+ 1 LSC/.357 MAGNUM | | | | | | | |
| 1 | Wet | 1435 | N 36 mm | 1 | Wet | 1450 | N 37 mm |
| 2 | Wet | 1421 | N | 2 | Wet | 1422 | N |
| 3 | Wet | 1438 | N | 3 | Wet | 1422 | N |
| 4 | Wet | 1429 | N* | 4 | Wet | 1444 | N* |
| 5 | Wet | 1425 | N* | 5 | Wet | 1404 | N* |
| 6 | Wet | 1430 | N | 6 | Wet | 1416 | N |
| 7 | Dry | 1435 | N 37 mm | 7 | Dry | 1422 | N 36 mm |
| 8 | Dry | 1438 | N | 8 | Dry | 1431 | N |
| 9 | Dry | 1417 | N | 9 | Dry | 1403 | N |
| 10 | Dry | 1448 | N* | 10 | Dry | 1443 | N* |
| 11 | Dry | 1440 | N* | 11 | Dry | 1435 | N* |
| 12 | Dry | 1432 | N | 12 | Dry | 1431 | N |
| BODY ARMOR TEST - MODEL MON-II+ 1 LSC/9 MM | | | | | | | |
| 13 | Wet | 1214 | N 29 mm | 13 | Wet | 1202 | N 28 mm |
| 14 | Wet | 1207 | N | 14 | Wet | 1210 | N |
| 15 | Wet | 1203 | N | 15 | Wet | 1219 | N |
| 16 | Wet | 1227 | N* | 16 | Wet | 1204 | N* |
| 17 | Wet | 1227 | N* | 17 | Wet | 1193 | N* |
| 18 | Wet | 1204 | N | 18 | Wet | 1193 | N |
| 19 | Dry | 1200 | N 26 mm | 19 | Dry | 1232 | N 28 mm |
| 20 | Dry | 1225 | N | 20 | Dry | 1187 | N |
| 21 | Dry | 1232 | N | 21 | Dry | 1217 | N |
| 22 | Dry | 1183 | N* | 22 | Dry | 1209 | N* |
| 23 | Dry | 1205 | N* | 23 | Dry | 1196 | N* |
| 24 | Dry | 1207 | N | 24 | Dry | 1176 | N |

* = 30 Degree Obliquity Impact
N = No Penetration

Samples of the composite ballistic panels 24 were also tested by E. I. duPont de Nemours' Spruance Fibers Plant in Richmond, Va. Samples were tested to military V-50 specifications. A baseline or reference sample was prepared by stacking sheets of KEVLAR® fabric until the stack weighed substantially the same as the article being tested. The maximum number of sheets of KEVLAR® material for the baseline sample is ensured by drying the KEVLAR® sheets prior to stacking to remove all moisture. As a result, the baseline has significantly more layers of KEVLAR® fabric than is present in the test samples since natural latex rubber weighs considerably more than KEVLAR® sheets. Submitted for testing was a composite ballistic panel 24 embodying the present invention made from 12 plies of KEVLAR 29, 1500 denier, 24-by-24 nibs per square inch in a basket-weave. The weight of each composite ballistic panel was approximately 0.94 pounds. The reference sample consisted solely of KEVLAR 29, 1500 denier, 24-by-24 cloth stacked up until it weighed 1.0 pound. Nine millimeter, FMJ rounds were then fired at one sample with the velocity of each round increased until one-half or 50 percent of the rounds fired penetrated through the composite panel. The same was done for the reference panel as well. Testing revealed that V-50, using 9 mm slugs for the baseline sample, occurred at 1400 feet per second, while V-50 using the same rounds of the 12-ply test sample occurred at 1491 feet per second, an improvement of more than 6 percent. Similar testing was conducted on a 17-ply composite panel embodying the invention. The 17-ply panels weighed in at 1.37 pounds, while the stack of baseline ballistic sheets weighed in at 1.35 pounds. V-50 testing with 9 mm rounds revealed that the test panel substantially equaled the baseline with 50 percent of the rounds penetrating through other panels at approximately 1600 feet per second. Although the testing did not specify the difference in thicknesses between the baseline stack of pure KEVLAR® and the panels embodying the invention, it is clear that there were significantly more plies of ballistic material in the baseline samples than in the test samples.

Samples of composite ballistic panels embodying the invention were also tested using ammunition intended to breach body armor. This ammunition includes NYCLAD 124 grain, 9 mm rounds made by Federal Cartridge Company. Outside the United States, these rounds are generally available under the designation 9×19. Similar munitions include Federal Cartridge's HYDRA-SHOK rounds, available in 124 grain, 9 mm; 158 grain, 357 Magnum; and 230 grain, 45 ACP (or Automatic Colt Pistol) calibers. These rounds are coated with TEFLON or similar material and have been shown to pass through many ballistic vests. The non-stick, low-friction coating is intended to reduce drag on the bullet as well as substantially reduce friction on the projectile as it passes through protective armor. The composite ballistic panel tested using this caliber ammunition was a 15-ply, 10×12 inch panel having a total thickness of 0.225 inch. The 15 plies were bound together with the natural rubber latex, as described above. The test was performed by law enforcement officers. In one test, seven 45 ACP HYDRA-SHOK rounds were fired at the test panel. All seven rounds bounced off the front face of the panel and were found at the bottom of panel carrier 22. The officers also simultaneously fired 36, 9 mm, FMJ rounds from a distance of 2 feet into an area approximately 16 square inches. Despite the multiple hits, not one round penetrated the panel. The same panel was then shot at a distance of 1 foot with 00 Buckshot from a 12-gauge shotgun. Not one pellet passed through the panel.

A 15-ply composite panel embodying the invention was also tested by law enforcement officers from Michigan. Testing included a close-burst of 32, 130 grain, 9 mm. FMJ machine gun rounds using an H&K MP-5 automatic weapon. None of the rounds passed through the panel. The same panel was then reversed and shot in the same general area by an additional burst of 16, 130 grain, 9 mm FMJ rounds. Again, no pass through occurred. Lastly, an 18-ply composite panel embodying the invention was tested for resistance to 12-gauge fleshettes. Fleshettes are multiple, arrow-like projectiles disposed within a 12-gauge shotgun shell. Each projectile consists of a case-hardened, TEFLON-coated shaft having a transverse diameter of about 3/32 of an inch (about 2 mm), with a sharpened point at one end and guide fins at the other end. The fleshettes are contained within a sabot which is released in-flight. When fired from a 32-inch barrel, the fleshettes travel at a velocity of approximately 1600 feet per second. In this particular test, the panel was shot from a distance of 20 feet so the fleshettes could stabilize and strike the panel point on. The same test was performed on a panel formed from 40-plies of sewn KEVLAR® material. In the panel of this invention, some of the fleshettes partially penetrated, with none protruding more than 0.5 inch from the back face. In the 40-ply reference panel, all of the fleshettes passed completely through.

Another surprising characteristic offered by composite panels embodying the instant invention is the ability to provide substantially the same ballistic resistance to rounds impacting very close to the edge of the panel. Conventional stitched or sewn vests offer no structure at the margins other than plies of material. It has been found in testing that edge shots of regularly plied material cause the material to puff and be deflected toward the interior of the panel, resulting in a total pass-through of the round. In the testing conducted by law enforcement officers, several shots hit the panel within one-half inch of the panel edge and were completely retained. One 9 mm FMJ round hit the panel on the edge. This round was not contained by the panel, but was sufficiently slowed such that it was found in the bottom of the carrier.

The advantages of the composite ballistic panel embodying this invention are clearly illustrated by the test data. Ballistic resistance generally comparable to current standards is provided in a ballistic panel which is substantially thinner and lighter than available today. Moreover, as a direct result of the construction, the ballistic panel does not absorb water, so the panel does not absorb perspiration—making the armor comfortable to wear as the day progresses. That is to say that the armor would not get heavier as a result of absorbing perspiration. Because of the panel construction, the panel is also buoyant. The mass of the panel is less than an equal volume of water at 4° C. This feature is critical for an individual wearing armor made from the panels who may find himself in deep water. A further advantage of the ballistic panel embodying the invention is the ability of the panel to take multiple hits in the same spot without failing. Prior and conventional sewn or laminated panels "puff" where hit with the fibers comprising the ballistic cloth becoming disorganized—the source of the ballistic properties. A second round in the same area encounters no resistance resulting in a pass-through.

TABLE 7

RIFLE FIRE

| 30 Layer Second Chance ™ III A | | | 30 Layer Matrix Sample | |
|---|---|---|---|---|
| 44 mag (240) | 1400 f/s | 3 | 357 mag, 158, FMJ | 1750 f/s |
| 9 mm (124) Pass Through | 1400 f/s | 3 | 357 mag, 158, LWC | 1800 f/s |
| | | 2 | 9 mm Largo 130 FMJ | 1370 f/s |
| 357 mag LWC 158 | 1700 | 1 | 9 mm 130 FMJ | 1500 f/s |
| 44 mag 240 Lead | 1800 | 1 | 9 mm 130 FMJ | 1800 f/s |
| 9 mm 130 FMJ | 1500 | 2 | 30 cal US Car 110 Sp | 1990 f/s |
| | | 2 | 44 mag 250 WC | 1680 f/s |
| | | 2 | 44 mag 250 WC | 1800 f/s |
| | | 2 | 30 Carb 110 FMJ (last layer) | 1990 f/s |
| | | 2 | 45–70 500 Lead | 1350 f/s |
| | | 2 | 45–70 300 JHP | 1620 f/s |
| | | 1 | 30–06 180 gm +AA | 2650 f/s |
| | | 1 | 444 Marlin 240 JSP +AA | 2450 f/s |
| | | 1 | 280 Ren 150 +AA Pass Through | 2850 f/s |
| | | 1 | 30–06 AP mil | 2800 f/s |
| | | 1 | 444 Marlin 240 JSP | 2450 f/s |
| | | 1 | 357 Mag AP 158 | 1800 f/s |
| | | 2 | 30 Carbine 110 FMJ (stopped in last layer) | |

I claim as my invention:

1. A ballistic-resistant article, comprising in combination:

a plurality of sheets of cloth made from high tensile-strength fibers, said cloth shaped generally to the contours of the object to be protected;

an elastic medium disposed between adjacent ones of said plurality of sheets of cloth and compressed between said plurality of sheets of cloth to a pressure ranging approximately between 10 and 15 pounds per square inch and heated to a temperature ranging approximately between 150° and 190° F. for approximately between 5 and 15 hours to produce a substantially rigid composite panel.

2. An article as defined in claim 1, wherein said plurality of sheets of cloth include at least one of woven fibers and cross-laminates of parallel, high tensile-strength fibers.

3. An article as defined in claim 1, wherein each of said sheet of cloth have a tensile modulus of at least 8000 pounds per square inch.

4. An article as defined in claim 1, wherein said elastic medium includes an elastomer having a milky colloid of at least one of a natural and synthetic rubber and plastic suspended in water.

5. An article as defined in claim 2, wherein said woven fibers are cross-laminates of parallel, high tensile-strength fibers include yams made from multiple fibers.

6. An article as defined in claim 1, wherein said cloth includes a double pick plain basket weave.

7. An article as defined in claim 5, wherein said yam is untwisted.

8. A flexible ballistic panel for use in a ballistic-resistant article, comprising:

a plurality of cloth laminations, each woven from a high tensile-strength yarn having a tenacity of at least 20 grams per denier;

an elastomer formed from at least one of natural rubber, synthetic rubber, and plastic colloid, disposed between each of said plurality of sheets of cloth and compressed and heated to bond said plurality of cloth laminations together into a semirigid panel; and said semirigid panel crimped at intervals along orthogonal axes to form the flexible ballistic panel.

9. A flexible ballistic panel as defined in claim 8, wherein said high-tensile strength yarn includes a plurality of high tensile-strength fibers spun into said high tensile-strength yarn.

10. A flexible ballistic panel as defined in claim 8, wherein said yarn includes an untwisted yarn.

11. A flexible ballistic panel as defined in claim 8, wherein said plurality of cloth laminations are woven to produce at least 22 nibs per lineal inch and less than 34 nibs per lineal inch.

12. A flexible ballistic panel as defined in claim 8, wherein said elastomer is natural latex rubber.

13. A flexible ballistic panel as defined in claim 8, wherein said semirigid panels includes crimps at intervals ranging between 0.125 inch and 0.5 inch.

14. A flexible ballistic panel as defined in claim 8, wherein said yarn includes aramid fibers.

15. A ballistic-resistant panel, comprising:

a plurality of layers of ballistic-resistant cloth woven from high tensile-strength fibers and having a denier ranging from about 700 to about 1600;

an elastomeric material between adjacent ones of said plurality of layers of cloth for bonding said plurality of alternative layers of ballistic-resistant cloth and elastomeric material, said composite laminate stretched at regular intervals to at least partially orient polymers within said elastomeric material between adjacent layers of cloth; and a carrier substantially surrounding said composite panel.

16. A ballistic-resistant panel as defined in claim 15, wherein said elastomeric material between adjacent ones of said plurality of layers includes a series of progressively stretched layers of elastomeric material from one side of said ballistic-resistant panel to an opposite side of said ballistic-resistant panel.

17. A ballistic-resistant panel as defined in claim 15, wherein said plurality of layers of ballistic-resistant cloth are woven in a basket-weave.

18. A ballistic-resistant panel as defined in claim 17, wherein said basket-weave includes a double pick plain basket-weave.

19. A ballistic-resistant panel as defined in claim 18, wherein said plurality of layers of ballistic-resistant cloth are woven to produce at least 22 nibs per lineal inch and less than 34 nibs per lineal inch.

* * * * *